United States Patent
Wise, Jr. et al.

(10) Patent No.: US 10,532,657 B2
(45) Date of Patent: Jan. 14, 2020

(54) DRIVE MECHANISM WITH REPLACEABLE SEAL AND ASSOCIATED METHOD

(71) Applicant: DEERE & COMPANY, Moline, IL (US)

(72) Inventors: Cecil H. Wise, Jr., Coffeyville, KS (US); Dwayne B. Watt, Bartlesville, OK (US); Randall L. Long, Coffeyville, KS (US); Danny G. Voth, Liberty, KS (US)

(73) Assignee: Deere & Company, Moline, IL (US)

( * ) Notice: Subject to any disclaimer, the term of this patent is extended or adjusted under 35 U.S.C. 154(b) by 100 days.

(21) Appl. No.: 15/943,881

(22) Filed: Apr. 3, 2018

(65) Prior Publication Data
US 2019/0299780 A1    Oct. 3, 2019

(51) Int. Cl.
*F16J 15/3268*    (2016.01)
*B60K 25/02*    (2006.01)
*F16D 1/02*    (2006.01)
*F16F 15/30*    (2006.01)

(52) U.S. Cl.
CPC ............ *B60K 25/02* (2013.01); *F16J 15/3268* (2013.01); *B60K 2025/022* (2013.01); *F16D 1/02* (2013.01); *F16D 2250/0084* (2013.01); *F16F 15/30* (2013.01)

(58) Field of Classification Search
CPC .. B60K 25/02; B60K 2025/022; B60K 17/28; F16J 15/3268; F16D 2250/0084; F16D 1/02; F16F 15/30
USPC .......................................................... 74/15.63
See application file for complete search history.

(56) References Cited

U.S. PATENT DOCUMENTS

| | | | |
|---|---|---|---|
| 6,117,016 A * | 9/2000 | Nett | B60K 17/22 464/179 |
| 8,776,957 B2 | 7/2014 | Knowles | |
| 2004/0201179 A1 | 10/2004 | Iwakata et al. | |
| 2008/0173495 A1* | 7/2008 | Komatsu | B60K 17/08 180/344 |
| 2010/0201072 A1 | 8/2010 | Wians et al. | |

FOREIGN PATENT DOCUMENTS

WO    2008006338 A1    1/2008

* cited by examiner

*Primary Examiner* — Keith J Frisby (57) ABSTRACT

A drive mechanism comprises a flywheel, a flywheel damper removably connected to the flywheel, a pump drive, and an intermediate shaft. The pump drive comprises a housing, an input shaft mounted to the housing for rotation relative thereto about an axis of rotation, and a seal surrounding the input shaft to establish a sealed connection therewith. The intermediate shaft is co-axial with the input shaft relative to the axis of rotation and removably connected to the flywheel damper and the input shaft. The seal is replaceable. An associated method for replacing the seal is disclosed.

14 Claims, 8 Drawing Sheets

DRIVE MECHANISM WITH REPLACEABLE SEAL AND ASSOCIATED METHOD

FIELD OF THE DISCLOSURE

The present disclosure relates to a drive mechanism, and, in particular, to replacement of a seal of the drive mechanism.

BACKGROUND OF THE DISCLOSURE

There are cotton harvesters that have a pump drive for driving various pumps of the harvester. The pump drive has an input shaft and a seal that establishes a sealed connection with the input shaft. It is known that replacement of the seal is a labor intensive process. To replace the seal, the technician is required to pull the pump drive out of the harvester and split the pump drive. It takes about 40 hours to complete the seal replacement.

SUMMARY OF THE DISCLOSURE

According to an aspect of the present disclosure, a method of replacing a seal of a pump drive is disclosed. The pump drive is included in a drive mechanism, which comprises a flywheel, a flywheel damper removably connected to the flywheel, and an intermediate shaft. The pump drive comprises a housing, an input shaft mounted to the housing for rotation relative thereto about an axis of rotation, and a seal surrounding the input shaft to establish a sealed connection therewith. The intermediate shaft is co-axial with the input shaft relative to the axis of rotation and is removably connected to the flywheel damper and the input shaft. The method comprises reconfiguring the intermediate shaft relative to the flywheel damper while the intermediate shaft remains connected to the input shaft thereby creating an axial space between the intermediate shaft and the flywheel damper relative to the axis of rotation, removing the flywheel damper from the flywheel through the axial space thereby providing an enlarged axial space between the intermediate shaft and the flywheel relative to the axis of rotation, removing the intermediate shaft from the input shaft through the enlarged axial space thereby eliminating the intermediate shaft as an obstacle to replacement of the seal, and replacing the seal with a fresh seal.

According to another aspect of the present disclosure, a drive mechanism comprises a flywheel, a flywheel damper removably connected to the flywheel, a pump drive, and an intermediate shaft. The pump drive comprises a housing, an input shaft mounted to the housing for rotation relative thereto about an axis of rotation, and a seal surrounding the input shaft to establish a sealed connection therewith. The intermediate shaft is co-axial with the input shaft relative to the axis of rotation and removably connected to the flywheel damper and the input shaft such that the intermediate shaft can be disconnected from the flywheel damper and moved along the input shaft axially in a first direction away from the flywheel damper relative to the axis of rotation for removal of the flywheel damper from the flywheel and can be moved along the input shaft axially in a second direction opposite to the first direction toward the flywheel relative to the axis of rotation for removal of the intermediate shaft from the input shaft to replace the seal.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
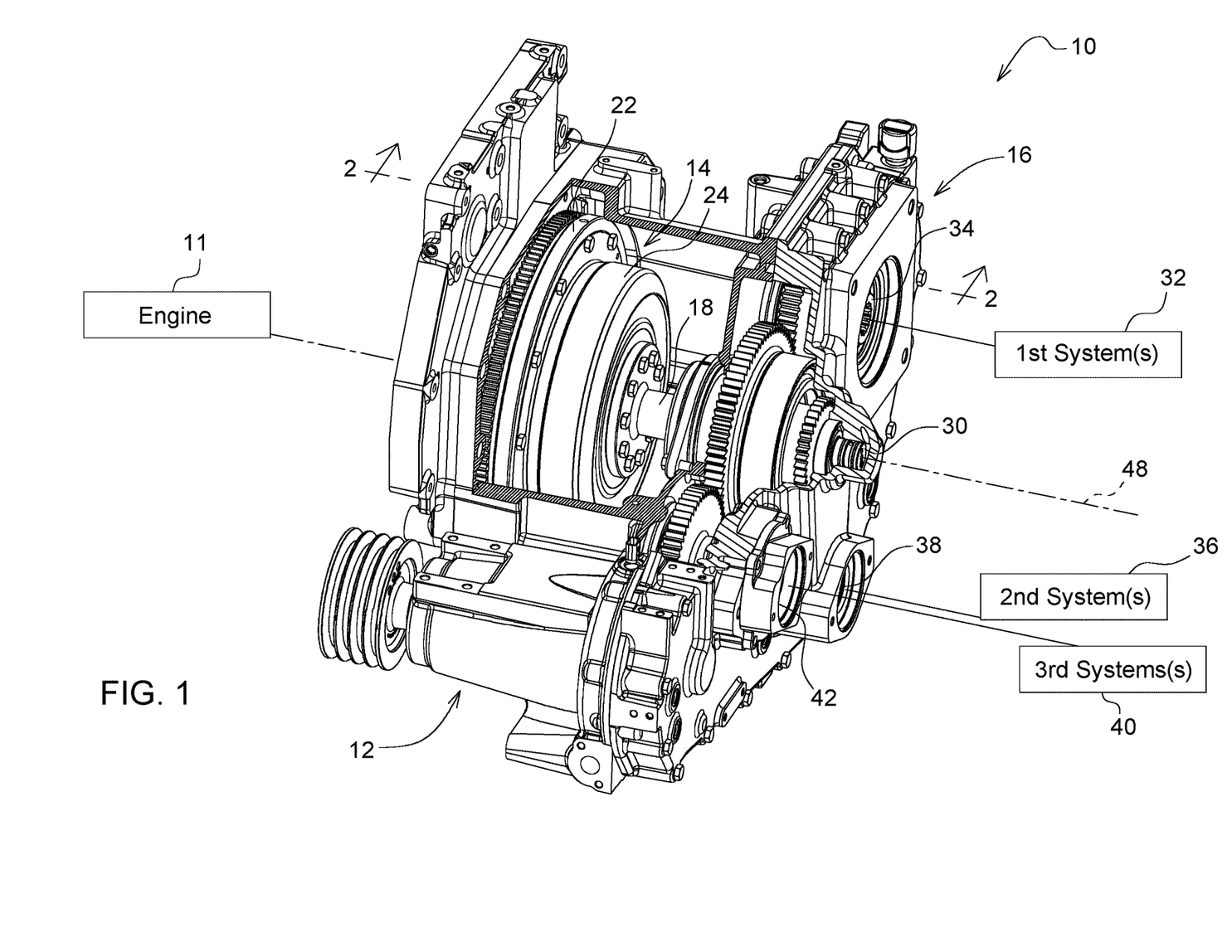
FIG. 1 is a perspective view, with portions broken away, showing a drive mechanism with a flywheel unit, a pump drive, and an intermediate shaft for transmitting rotary power from the flywheel unit to the pump drive.
Figure 2:
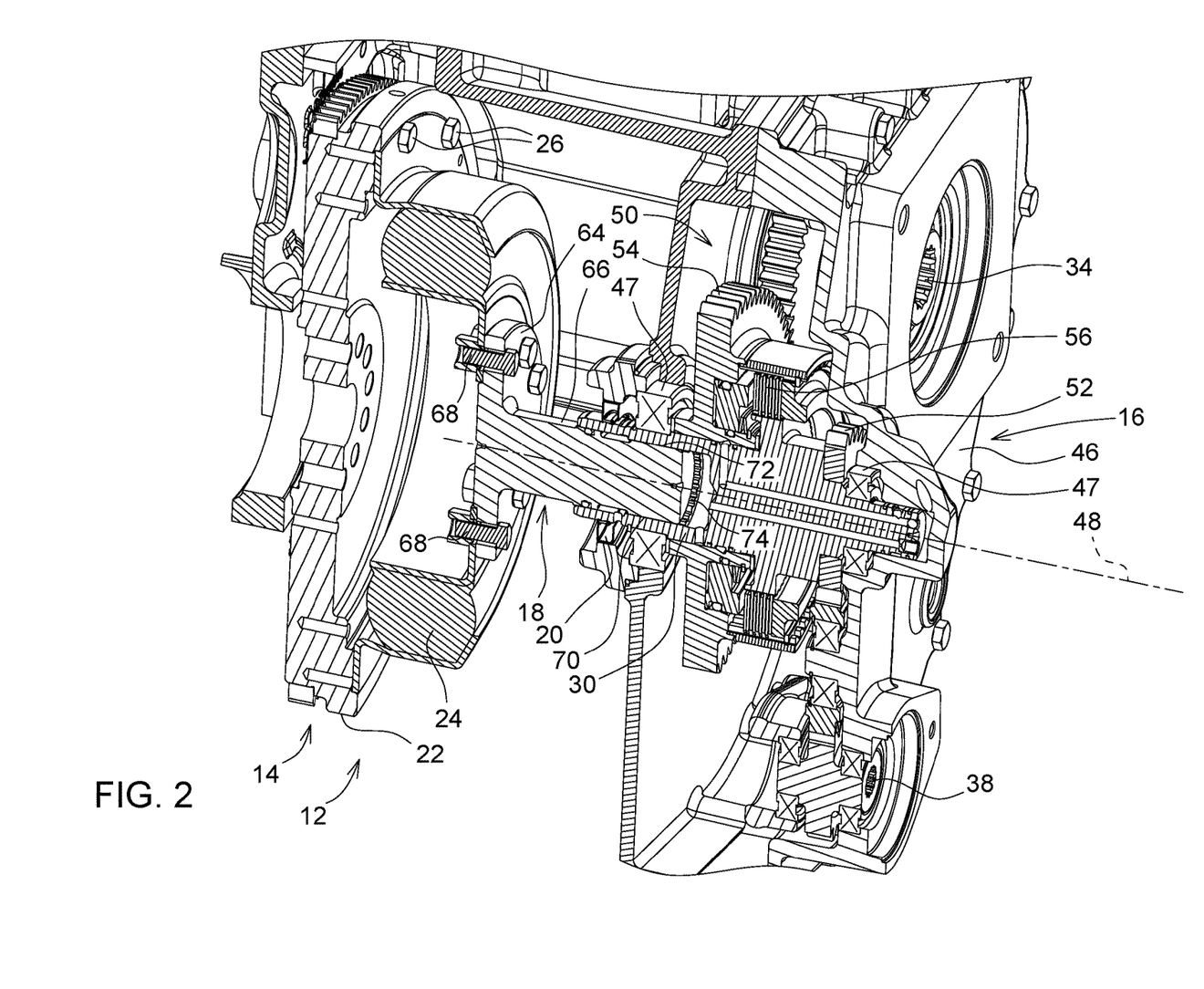
FIG. 2 is a perspective view, with portions broken away, showing the intermediate shaft removably connected to a flywheel damper of the flywheel unit and an input shaft of the pump drive.

Referring to FIGS. 1 and 2, a vehicle 10 comprises an engine 11 and a drive mechanism 12. The drive mechanism 12 comprises a flywheel unit 14, a pump drive 16, and an intermediate shaft 18 interconnecting the flywheel unit 14 and the pump drive 16. The drive mechanism 12 is configured to enable removal and replacement of a seal 20 of the pump drive 16.

The engine 11 powers the pump drive 16. The flywheel unit 14 comprises a flywheel 22 and a flywheel damper 24 removably connected to the flywheel 22 via bolts 26 or other suitable fasteners. A crankshaft (not shown) of the engine 11 is connected via bolts (not shown) or other suitable fasteners to the flywheel 22. The intermediate shaft 18 is removably connected to the flywheel damper 24 and the pump drive 16 to drive an input shaft 30 of the pump drive 16.

The vehicle 10 may comprise one or more systems driven by the pump drive 16. The pump drive 16 may have one or more rotary outputs to drive those system(s). In an example, such system(s) may include first system(s) 32 driven by a rotary first drive output 34 of the pump drive 16, second system(s) 36 driven by a rotary second drive output 38 of the pump drive 16, and third system(s) 40 driven by a rotary third drive output 42 of the pump drive 16. The first system(s) 32 may comprise, for example, the vehicle propulsion system, with the first drive output 34 connected to a transmission of the propulsion system to drive the transmission. The second system(s) 36 may comprise, for example, systems related to or including steering, brakes, and a scavenge pump. In an example where the vehicle 10 may be a cotton harvester, the third system(s) 40 may comprise, for example, systems related to or including picking unit drives and an onboard baler. The vehicle 10 may be configured as other types of vehicles.

The pump drive 16 comprises a housing 46. The input shaft 30 is positioned at least partially in the housing 46, and is mounted to the housing 46 via two bearings 47 (e.g., ball bearings) for rotation relative to the housing 46 about an axis of rotation 48.

The pump drive 16 comprises a gear arrangement 50. The gear arrangement comprises a number of gears between the input shaft 30 and the drive outputs 34, 38, 42 to transmit power therebetween. For example, the gear arrangement 50 may comprise a first gear 52 fixed to the input shaft 30, and a second gear 54 rotatable with the input shaft upon activation of a clutch 56. It will be appreciated that the gear arrangement 50 may be configured in a wide variety of ways, with the input shaft 30 providing input power to the pump drive 16 and the one or more drive outputs of the pump drive 16 providing output power from the pump drive 16.

Figure 3:
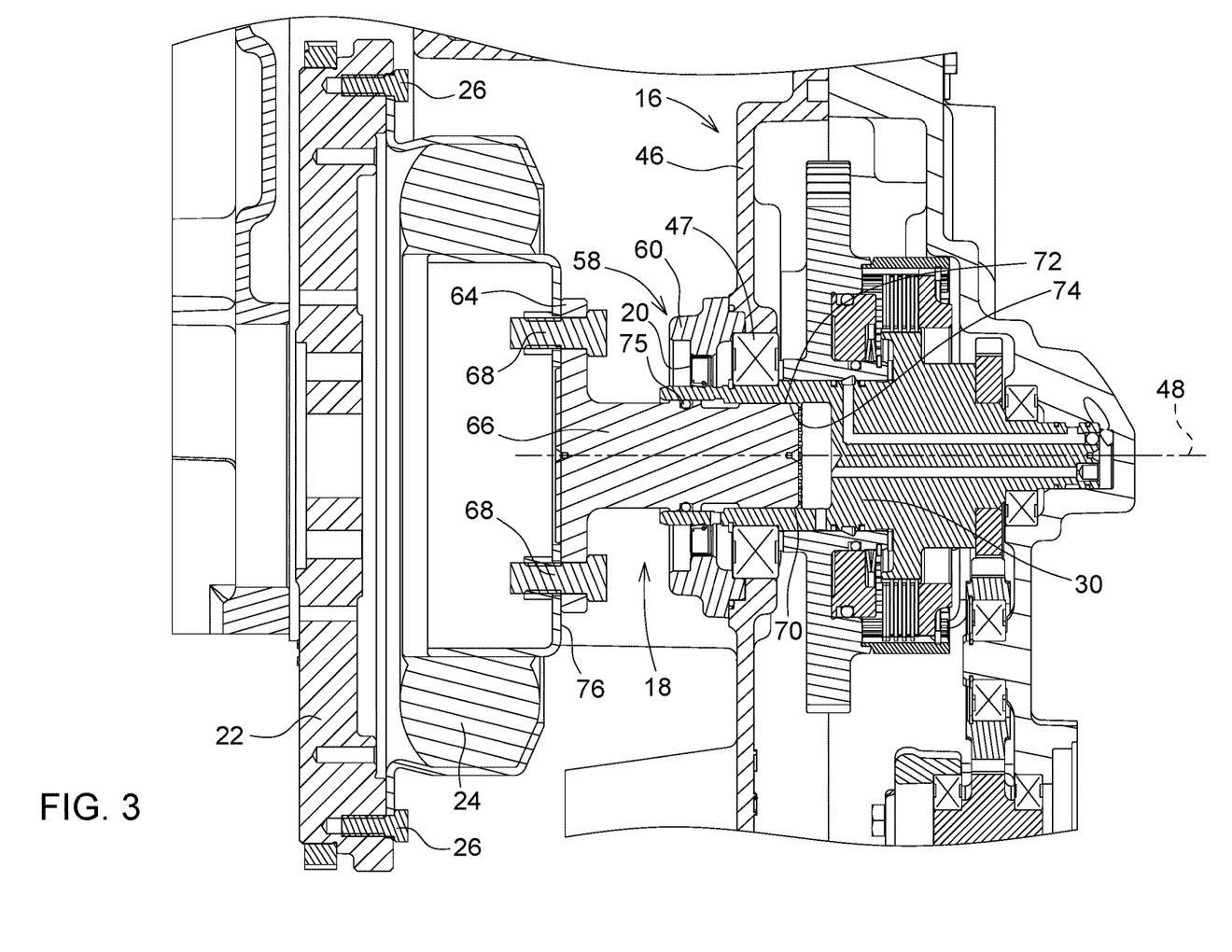
FIG. 3 is a sectional view, taken along lines 3-3 of FIG. 1, showing the intermediate shaft positioned in a use position.
Figures 4A, 4B:
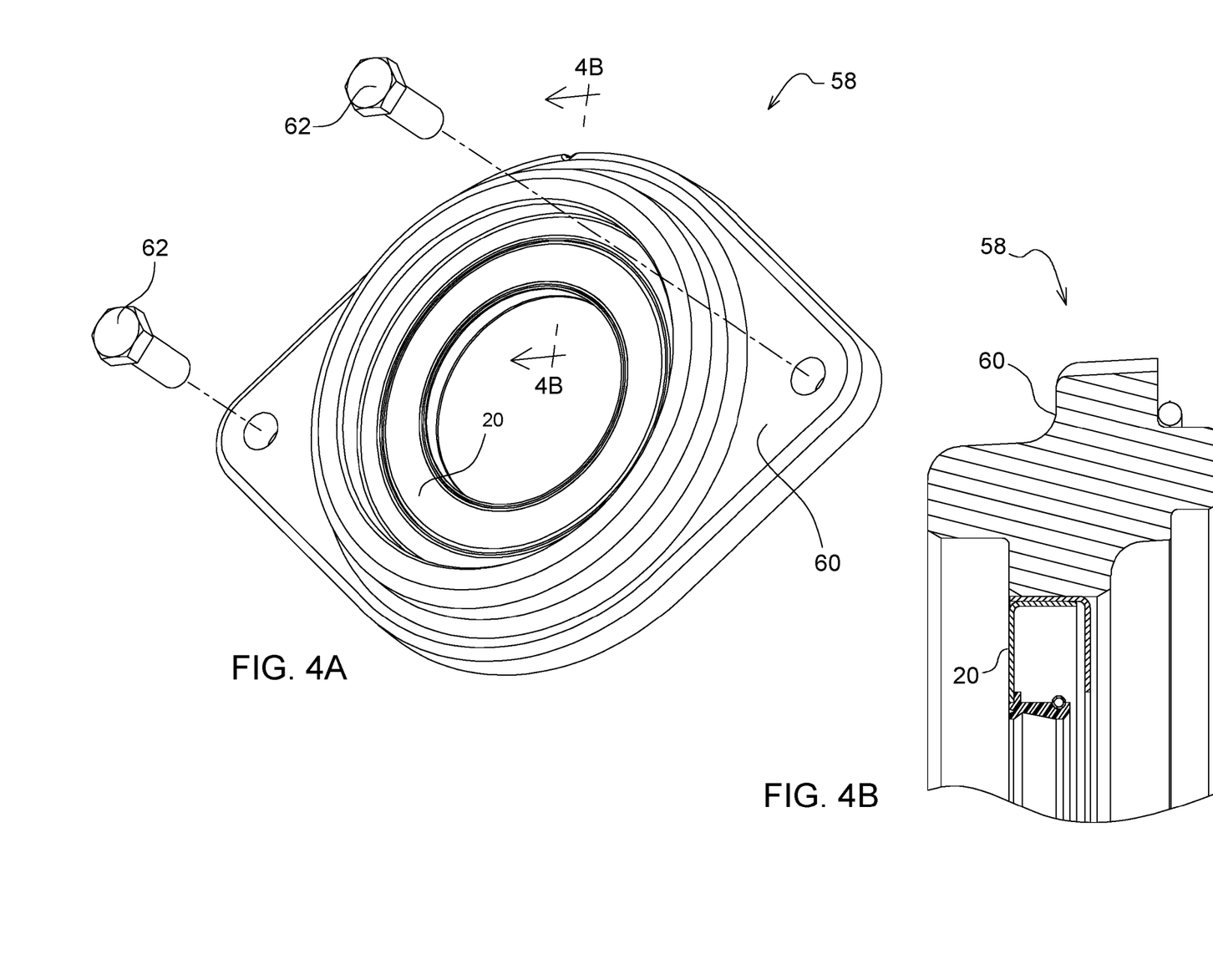
FIG. 4A is a perspective view showing a seal unit comprising a quill and a seal mounted to the quill.
FIG. 4B is a sectional view, taken along lines 4B-4B of FIG. 4A.

Referring to FIGS. 3, 4A, and 4B, the pump drive 16 comprises a seal unit 58 removably connected to the housing 46. The seal unit 58 comprises a quill 60 and the seal 20 mounted to the quill 60. The quill 60 is removably connected to the housing 46 via bolts 62 or other suitable fasteners. As such, the seal 20 is mounted and positioned exterior to the housing 46, and surrounds the input shaft 30 to establish a sealed connection therewith.

The intermediate shaft 18 is removably connected to the flywheel damper 24. The intermediate shaft 18 comprises an annular flange 64 extending radially outwardly from a body 66 relative to the axis of rotation 48. The flange 64 is removably connected to the flywheel damper 24 via bolts 68 or other suitable fasteners. The seal 20 is positioned exterior to the housing 46 between the housing 46 and the flange 64.

The intermediate shaft 18 is removably connected to the input shaft 30 such that the intermediate shaft 18 is co-axial with the input shaft 30 relative to the axis of rotation 48. The intermediate shaft 18 may be, for example, splined or keyed to the input shaft 30, or otherwise connected to the input shaft 30 against rotation relative thereto about the axis of rotation 48. In the illustrated embodiment, the intermediate shaft 18 and the input shaft 30 are splined to one another to provide a splined joint 70. An externally splined portion 72 of the body 66 of the intermediate shaft 18 mates with an internally splined bore 74 of the input shaft 30 for axially slidable engagement therebetween. As such, the intermediate shaft 18 is received within the splined bore 74 of the input shaft 30, such that the intermediate shaft 18 serves as an input hub. Such a configuration of the intermediate and input shafts 18, 20 is relatively compact. In other embodiments, the input shaft may comprise an axial extension that is externally splined and received within an internally splined bore of the intermediate shaft.

The intermediate shaft 18 transmits power from the flywheel unit 14 to the pump drive 16. Rotation of the flywheel unit 14 about the axis of rotation 48 causes the intermediate shaft 18 to rotate about the axis 48, which, in turn, causes the input shaft 30 to rotate about the axis 48 via the splined joint 70. As such, rotation of the shaft 18 about the axis of rotation 48 transmits rotary power from the flywheel damper 24 to the input shaft 30.

The seal 20 blocks egress of lubricant from the pump drive 16 and ingress of debris into the pump drive 16. Lubricant that enters the bore 74 via a channel at the end of the bore 74 can flow through the splined joint 70 for lubrication of the joint 70. An O-ring seal 75 establishes a sealed connection between the intermediate shaft 18 and the input shaft 30 (in smooth, unsplined portions of those shafts 18, 30). The lubricant may flow through one or more ports in a side wall of the bore 74. For example, there may be a port in the side wall of the bore 74 to a cavity between the seal 20 and a bearing for lubrication of the seal 20 and bearing, and another port to lubricate the journal bearing between the input shaft 30 and the second gear 54 (the input gear). In other embodiments, there may be more or less ports, depending on the application.

Referring to FIGS. 5-8, a method 110 can be used to replace the seal 20. The seal 20 may become worn or otherwise reach the end of its useful life. A person (e.g., a technician) may replace the seal 20 with a fresh seal 20 according to the method 110. The replacement process may take about two hours.

Figure 6:
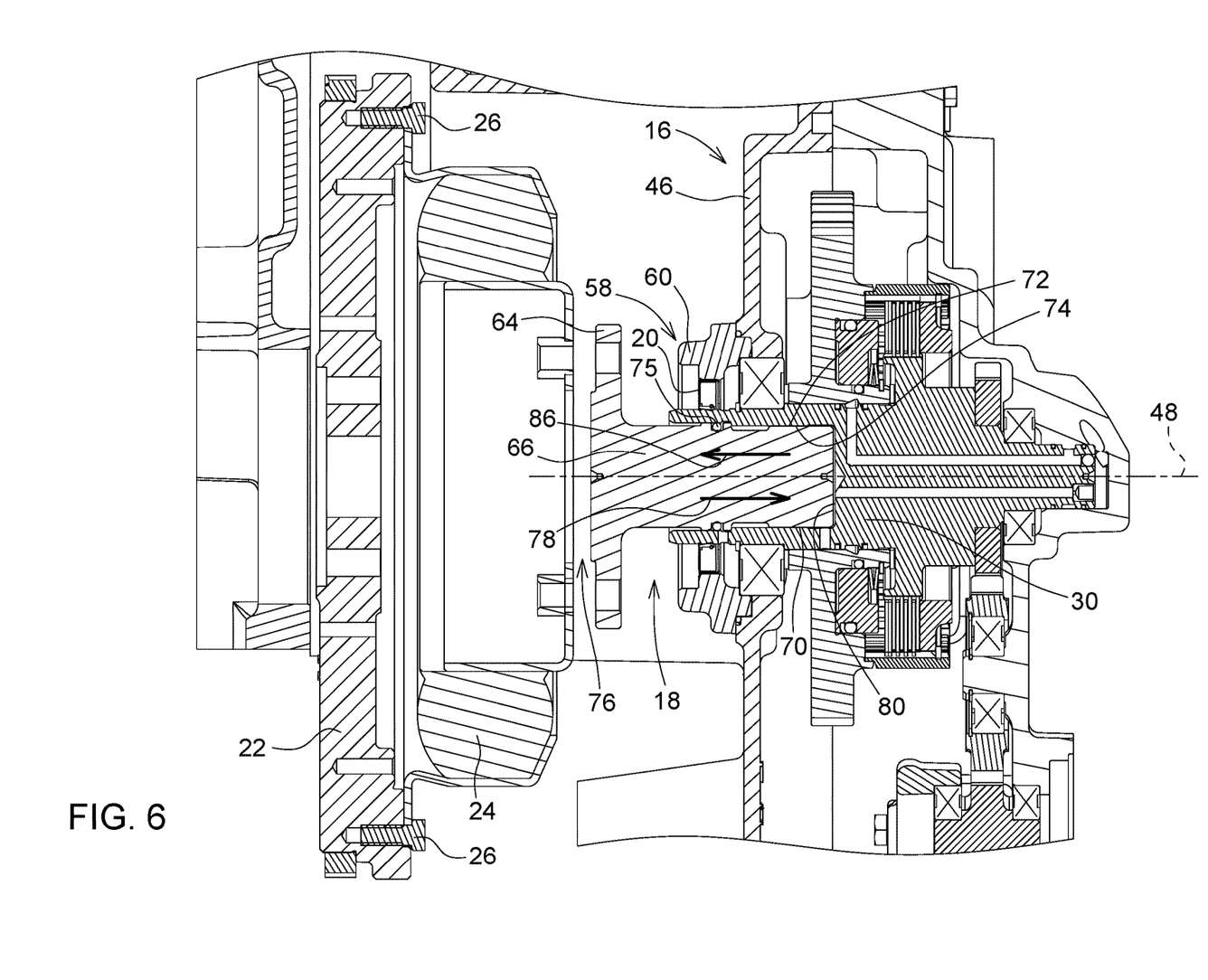
FIG. 6 is a sectional view showing the intermediate shaft positioned in a retracted position creating an axial space between the intermediate shaft and the flywheel damper.

Referring to FIGS. 3 and 6, the intermediate shaft 18 is arranged to move between a first, use position (FIG. 3) removably connected to the flywheel damper 24 and a second, retracted position (FIG. 6) spaced apart from the flywheel damper 24. In the use position, the flywheel damper 24 radially overlaps the intermediate shaft 18 relative to the axis of rotation 48. For example, the flywheel damper 24 radially overlaps the flange 64 relative to the axis 48. As such, in the use position the intermediate shaft 18 blocks radial removal of the flywheel damper 24 from the flywheel 22, e.g., downward removal of the flywheel damper 24 from the flywheel 22). In the retracted position, the intermediate shaft 18 no longer blocks radial, downward removal of the flywheel damper 24 from the flywheel 22.

Figure 5:
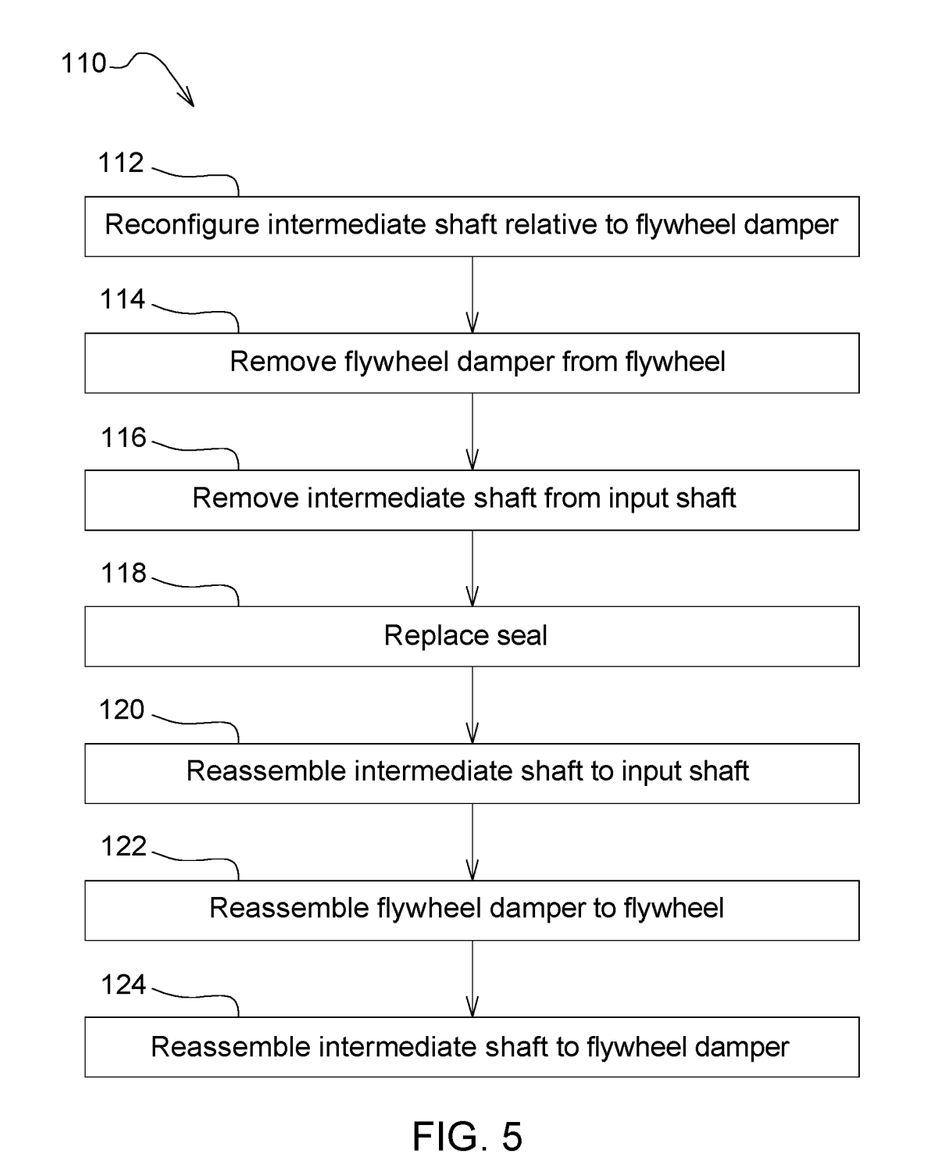
FIG. 5 is a flowchart showing a method for replacing the seal with a fresh seal.

Referring to FIGS. 5 and 6, in step 112, to effect such movement between the use and retracted positions, the intermediate shaft 18 is reconfigured relative to the flywheel damper 24 while the intermediate shaft 18 remains connected to the input shaft 30 thereby creating an axial space 76 between the intermediate shaft 18 and the flywheel damper 24 relative to the axis of rotation 48. The intermediate shaft 18 is disconnected (e.g., unbolted) from the flywheel damper 24. The intermediate shaft 18 is moved along the input shaft 30 axially in a first direction 78 away from the flywheel damper 24 relative to the axis of rotation 48. The intermediate shaft 18 is moved along the splined joint 70 in the first direction 78. The intermediate shaft 18 is moved within the splined bore 74 of the input shaft 30 in the first direction 78 toward an end wall 80 of the splined bore 74.

As such, the intermediate shaft 18 is arranged to move within the bore 74 between the use position removably connected to the flywheel damper 24 and spaced apart from the end wall 80 and the retracted position spaced apart from the flywheel damper 24 and positioned closer to the end wall 80 than in the use position.

Figure 7:
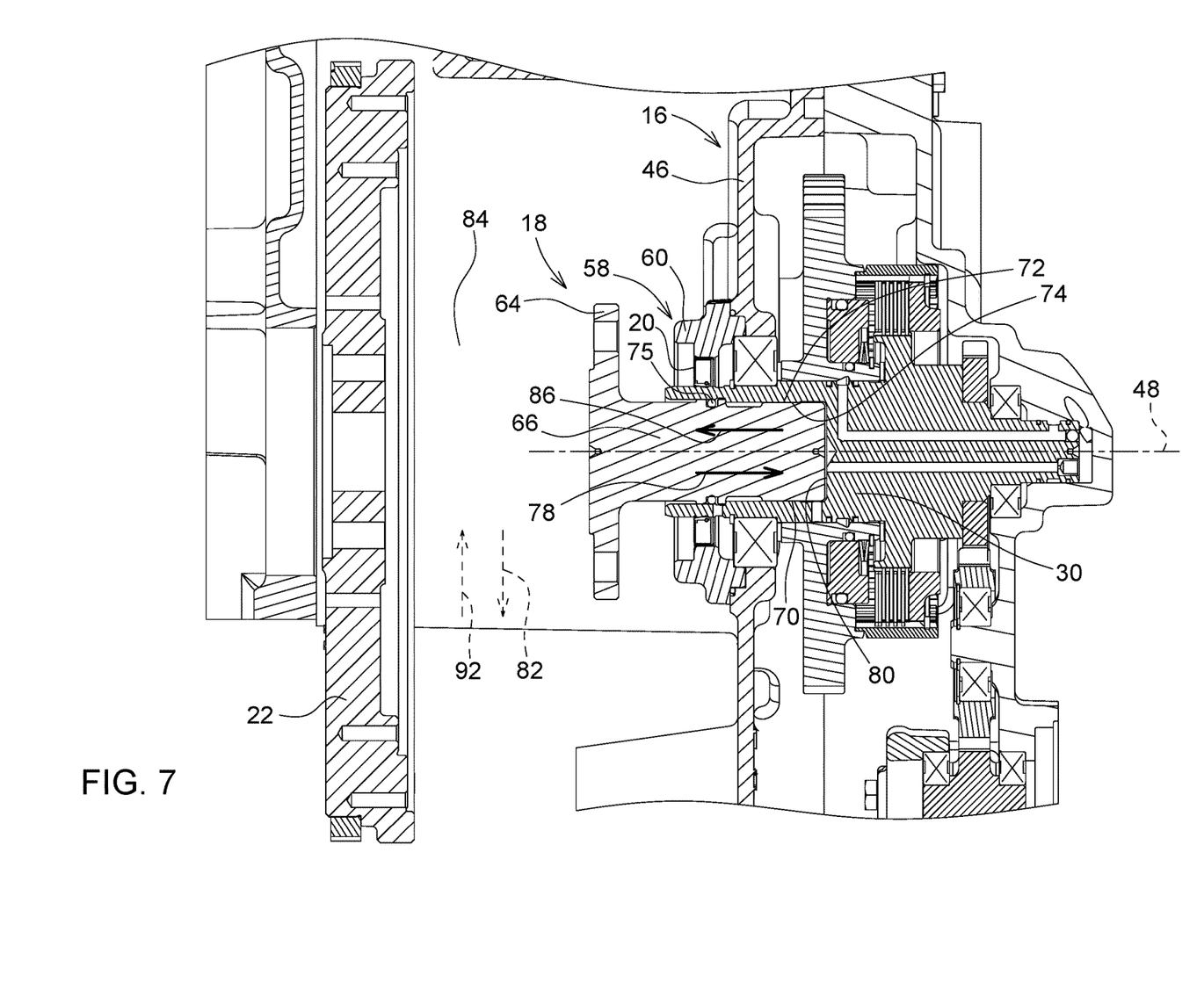
FIG. 7 is a sectional view showing an enlarged axial space between the intermediate shaft and the flywheel due to removal of the flywheel damper from the flywheel.

Referring to FIGS. 5 and 7, in step 114, the flywheel damper 24 is removed from the flywheel 22 through the axial space 76 thereby providing an enlarged axial space 84 between the intermediate shaft 18 and the flywheel 22 relative to the axis of rotation 48. The flywheel damper 24 is disconnected (e.g., unbolted) from the flywheel 22, and moved away from the flywheel 22 through the axial space 76 in a generally downward direction 82, thereby removing the flywheel damper 24 from the flywheel 22 and the drive mechanism 12. Such removal of the flywheel damper 24 enables removal of the intermediate shaft 18 from the input shaft 30.

The intermediate shaft 18 blocks replacement of the seal 20 when the intermediate shaft 18 is connected to the input shaft 30. The outside diameter of the flange 64 is larger than the inside diameter of the seal 20. As such, the flange 64 blocks removal of the seal 20 from the drive mechanism 12.

Figure 8:
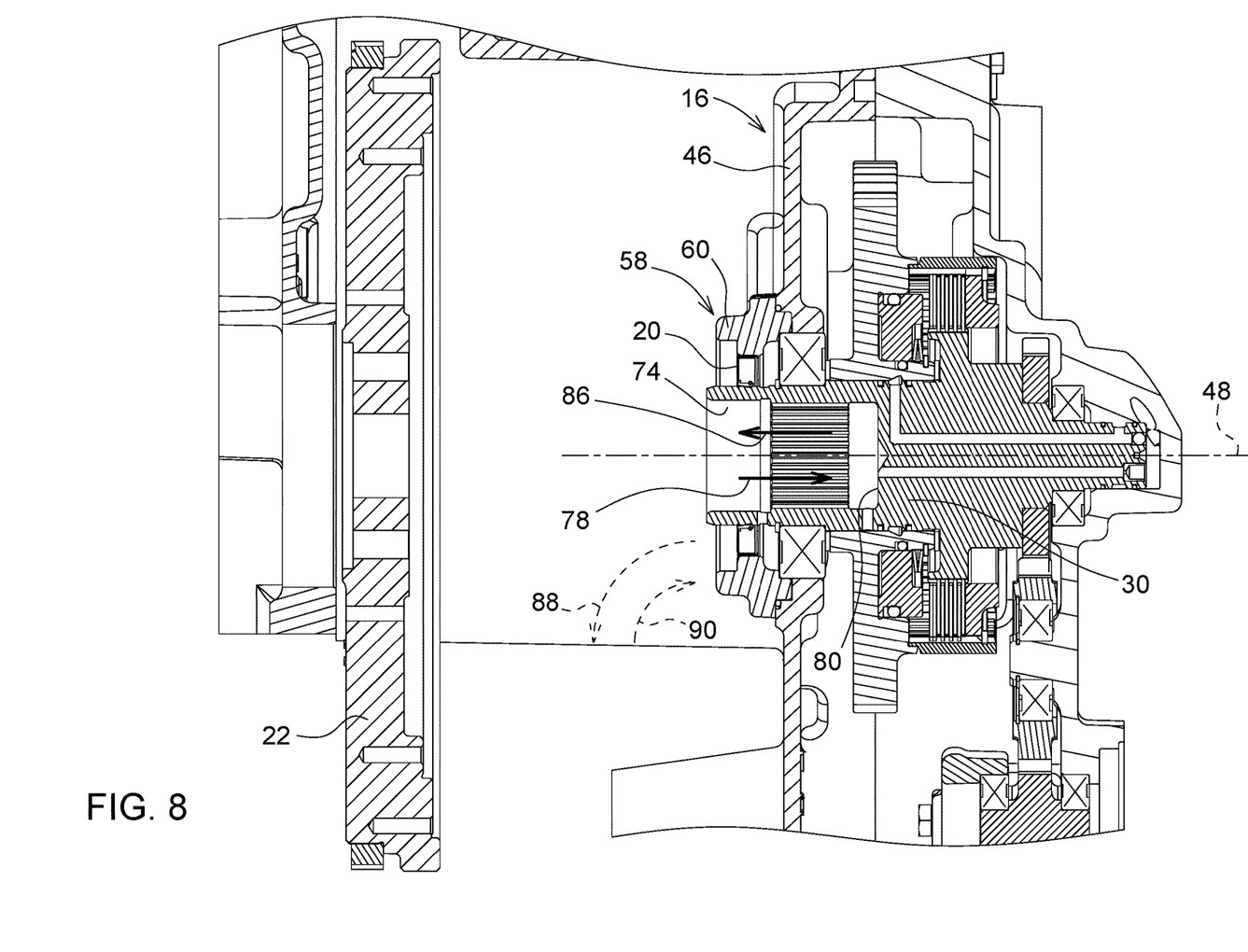
FIG. 8 is a sectional view showing replacement of the seal with a fresh seal by removing the seal (indicated by a first arrow) and installing a fresh seal in its place (indicated by a second arrow).

Referring to FIGS. 5 and 8, in step 116, the intermediate shaft 18 is removed from the input shaft 30 through the enlarged axial space 84 thereby eliminating the intermediate shaft 18 as an obstacle to replacement of the seal 20. The intermediate shaft 18 is moved along the input shaft 30 axially in a second direction 86 opposite to the first direction 78 toward the flywheel 22 relative to the axis of rotation 48. The intermediate shaft 18 is moved along the splined joint 70 in the second direction 86. The intermediate shaft 18 is moved within the splined bore 74 in the second direction 86 away from the end wall 80. At this point, the flywheel damper 24 and the intermediate shaft 18 have been removed from the drive mechanism 12.

Referring further to FIGS. 5 and 8, in step 118, the seal 20 is replaced with a fresh seal 20. The seal 20 is removed from the pump drive 16 as indicated by the arrow 88, and the fresh seal 20 is installed to the pump drive 16 as indicated by the arrow 90. The depiction of the seal 20 in FIG. 8 is intended to represent the seal before replacement (the used seal) and the seal after replacement (the fresh seal).

To remove the seal 20, the quill 60 is disconnected (e.g., unbolted) from the housing 46 and moved away from the housing 46 so as to move the seal 20 off the input shaft 30. The bolts 62 of the quill 60 are removed from the housing 60 to disconnect the quill 60 from the housing 60. The used seal 20 is then replaced with a fresh seal 20 in the quill 60.

The fresh seal 20 is then installed to the pump drive 16. The fresh seal 20 is positioned on the input shaft 30 so as to surround the input shaft 30, and the quill is reconnected (e.g., bolts with bolts 62) to the housing 46.

In the illustrated embodiment, the seal 20 is replaced with the fresh seal 20 after the intermediate shaft 18 is removed from the input shaft 30. The intermediate shaft 18 is removed from the input shaft 30 in step 116, and the seal 20 is removed from the pump drive 16 in step 118. In other embodiments, the seal 20 may be removed with the intermediate shaft 18. In such a case, the quill 60 may be unbolted from the housing 46, and the quill 60 and seal 20 may be moved with the intermediate shaft 18 away from the pump drive 16. The two-step removal process may be less cumbersome than the single step removal process. In either case, the intermediate shaft 18 is removed in order to allow removal of the seal 20.

The drive mechanism 12 may now be reassembled by generally following the above steps in reverse.

Referring to FIGS. 5 and 7, in step 120, the intermediate shaft 18 is reassembled to the input shaft 30. The intermediate shaft 18 is reintroduced to the input shaft 30 (e.g., inserted into the bore 74 of the input shaft 30), and moved along the input shaft 30 axially in the first direction 78 away from the flywheel 22 relative to the axis of rotation 48 to the retracted position. The intermediate shaft 18 is moved along the splined joint 70 in the first direction 78. The intermediate shaft 18 is moved within the splined bore 74 in the first direction 78 toward the end wall 80 to the retracted position. In this way, the intermediate shaft 18 may be reconnected and reassembled to the input shaft 30.

Referring to FIGS. 5 and 6, in step 122, the flywheel damper 24 is reassembled to the flywheel 22. The flywheel damper 24 is moved through the enlarged axial space 84 between the intermediate shaft 18 and the flywheel 22 in a generally upward direction 92. When in position, the flywheel damper 24 is reconnected to the flywheel 22 (e.g., bolted with bolts 26). This reduces the enlarged axial space 84 to the axial space 76.

Referring to FIGS. 5 and 3, in step 124, the intermediate shaft 18 is reassembled to the flywheel damper 24. The intermediate shaft 18 is moved along the input shaft 30 axially in the second direction 86 toward the flywheel damper 24 relative to the axis of rotation 48 from the retracted position to the use position. The intermediate shaft 18 is moved along the splined joint 70 in the second direction 86. The intermediate shaft 18 is moved along the splined joint 70 in the second direction 86. The intermediate shaft 18 is reconnected to the flywheel damper 24 (e.g., bolted with bolts 68), eliminating the axial space 76. The flange 64 is so reconnected to the flywheel damper 24.

For ease of illustration in the drawings, threads are not shown, and some components are shown without hatching in some drawings (e.g., O-rings, spring, plates and disks of pack, seal components, retainer clips), with the threads and hatching to be understood. Further for ease of illustration, the O-rings are shown in their nominal state, with compression to be understood.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method of replacing a seal of a pump drive of a drive mechanism, the drive mechanism comprising a flywheel, a flywheel damper removably connected to the flywheel, and an intermediate shaft, the pump drive comprising a housing, an input shaft mounted to the housing for rotation relative thereto about an axis of rotation, and a seal surrounding the input shaft to establish a sealed connection therewith, the intermediate shaft co-axial with the input shaft relative to the axis of rotation and removably connected to the flywheel damper and the input shaft, the method comprising:
   reconfiguring the intermediate shaft relative to the flywheel damper while the intermediate shaft remains connected to the input shaft thereby creating an axial space between the intermediate shaft and the flywheel damper relative to the axis of rotation,
   removing the flywheel damper from the flywheel through the axial space thereby providing an enlarged axial space between the intermediate shaft and the flywheel relative to the axis of rotation,
   removing the intermediate shaft from the input shaft through the enlarged axial space thereby eliminating the intermediate shaft as an obstacle to replacement of the seal, and
   replacing the seal with a fresh seal.

2. The method of claim 1, wherein the reconfiguring comprises disconnecting the intermediate shaft from the flywheel damper and moving the intermediate shaft along the input shaft axially in a first direction away from the flywheel damper relative to the axis of rotation.

3. The method of claim 2, wherein the removing the intermediate shaft comprises moving the intermediate shaft along the input shaft axially in a second direction opposite to the first direction toward the flywheel relative to the axis of rotation.

4. The method of claim 3, wherein the intermediate shaft and the input shaft are splined to one another to provide a splined joint, the moving the intermediate shaft in the first direction comprises moving the intermediate shaft along the splined joint in the first direction, and the moving the intermediate shaft in the second direction comprises moving the intermediate shaft along the splined joint in the second direction.

5. The method of claim 4, wherein the moving the intermediate shaft along the splined joint in the first direction comprises moving the intermediate shaft within a splined bore of the input shaft in the first direction toward an end wall of the splined bore, and the moving the intermediate shaft along the splined joint in the second direction comprises moving the intermediate shaft within the splined bore in the second direction away from the end wall.

6. The method of claim 1, wherein removing the flywheel damper comprises disconnecting the flywheel damper from the flywheel and moving the flywheel damper away from the flywheel.

7. The method of claim 1, wherein the replacing comprises replacing the seal with the fresh seal after the removing the intermediate shaft from the input shaft.

8. The method of claim 1, wherein the replacing comprises removing the seal from the pump drive and installing the fresh seal to the pump drive.

9. A drive mechanism, comprising
a flywheel,
a flywheel damper removably connected to the flywheel,
a pump drive comprising a housing, an input shaft mounted to the housing for rotation relative thereto about an axis of rotation, and a seal surrounding the input shaft to establish a sealed connection therewith, and
an intermediate shaft co-axial with the input shaft relative to the axis of rotation and removably connected to the flywheel damper and the input shaft such that the intermediate shaft can be disconnected from the flywheel damper and moved along the input shaft axially in a first direction away from the flywheel damper relative to the axis of rotation for removal of the flywheel damper from the flywheel and can be moved along the input shaft axially in a second direction opposite to the first direction toward the flywheel relative to the axis of rotation for removal of the intermediate shaft from the input shaft to replace the seal.

10. The drive mechanism of claim 9, wherein the intermediate shaft is splined to the input shaft.

11. The drive mechanism of claim 10, wherein the intermediate shaft is received within a splined bore of the input shaft.

12. The drive mechanism of claim 10, wherein the intermediate shaft comprises a flange removably connected to the flywheel damper.

13. The drive mechanism of claim 9, wherein the intermediate shaft is arranged to move within a bore of the input shaft between a use position removably connected to the flywheel damper and spaced apart from an end wall of the bore and a retracted position spaced apart from the flywheel damper and positioned closer to the end wall than in the use position.

14. The drive mechanism of claim 9, wherein the intermediate shaft comprises a flange removably connected to the flywheel damper, and the seal is positioned exterior to the housing between the housing and the flange.

* * * * *